US009556539B2

(12) United States Patent
Miyauchi et al.

(10) Patent No.: US 9,556,539 B2
(45) Date of Patent: Jan. 31, 2017

(54) SHRINKABLE FIBER FOR POROUS MOLDED BODY

(71) Applicants: ES FiberVisions Co., Ltd., Osaka-shi, Osaka (JP); ES FiberVisions Hong Kong Limited, Kowloon (HK); ES FiberVisions LP, Athens, GA (US); ES FiberVisions ApS, Varde (DK)

(72) Inventors: Minoru Miyauchi, Osaka (JP); Yasushi Matsuda, Osaka (JP); Yuji Koyama, Osaka (JP)

(73) Assignees: ES FiberVisions Co., Ltd., Osaka (JP); ES FiberVisions Hong Kong Limited, Kowloon (HK); ES FiberVisions LP, Athens, GA (US); ES FiberVisions ApS, Varde (DK)

(*) Notice: Subject to any disclaimer, the term of this patent is extended or adjusted under 35 U.S.C. 154(b) by 318 days.

(21) Appl. No.: 13/773,065

(22) Filed: Feb. 21, 2013

(65) Prior Publication Data
US 2013/0161853 A1 Jun. 27, 2013

Related U.S. Application Data

(63) Continuation of application No. 12/675,533, filed as application No. PCT/JP2008/066134 on Sep. 1, 2008, now abandoned.

(30) Foreign Application Priority Data

Aug. 31, 2007 (JP) ................. 2007-225476
Apr. 18, 2008 (JP) ................. 2008-109077

(51) Int. Cl.
*B29C 35/00* (2006.01)
*D01F 6/04* (2006.01)
*D01F 6/00* (2006.01)
*D01F 8/06* (2006.01)
*D01F 6/30* (2006.01)
*D01F 8/04* (2006.01)

(52) U.S. Cl.
CPC ............... *D01F 6/04* (2013.01); *B29C 35/00* (2013.01); *D01F 6/00* (2013.01); *D01F 6/30* (2013.01); *D01F 8/04* (2013.01); *D01F 8/06* (2013.01); *Y10T 428/298* (2015.01); *Y10T 428/2929* (2015.01)

(58) Field of Classification Search
CPC .. A61L 27/10; A61F 2/38; A61F 2002/30133; A61C 13/0003
See application file for complete search history.

(56) References Cited

U.S. PATENT DOCUMENTS

| 3,510,394 A | * | 5/1970 | Cadotte | C04B 30/02 162/145 |
|---|---|---|---|---|
| 4,071,596 A | | 1/1978 | Davis | |
| 4,323,626 A | | 4/1982 | Kunimune et al. | |
| 4,351,867 A | * | 9/1982 | Mulvey | B28B 1/50 428/312.4 |
| 4,469,540 A | * | 9/1984 | Furukawa et al. | 156/62.4 |
| 4,536,360 A | * | 8/1985 | Rahrig | C08K 7/14 264/142 |
| 5,204,041 A | | 4/1993 | Tashiro et al. | |
| 5,227,224 A | | 7/1993 | Ishikawa et al. | |
| 5,238,612 A | | 8/1993 | Halm et al. | |
| 5,252,158 A | * | 10/1993 | Shimizu et al. | 156/167 |
| 5,338,500 A | | 8/1994 | Halm et al. | |
| 5,620,641 A | * | 4/1997 | Berger | 264/103 |
| 6,096,249 A | * | 8/2000 | Yamaguchi | 264/40.3 |
| 6,174,603 B1 | | 1/2001 | Berger | |
| 6,218,593 B1 | * | 4/2001 | Torimae et al. | 604/366 |
| 6,379,446 B1 | * | 4/2002 | Andersen | C08L 1/02 106/137.1 |
| 6,617,024 B2 | | 9/2003 | Sudo et al. | |
| 6,632,527 B1 | * | 10/2003 | McDaniel | B01J 2/20 166/295 |
| 7,670,677 B2 | | 3/2010 | Usui et al. | |
| 8,187,423 B1 | * | 5/2012 | Glenn | B29C 70/443 162/141 |
| 2002/0048676 A1 | * | 4/2002 | McDaniel | A63K 1/00 428/404 |
| 2002/0079604 A1 | * | 6/2002 | Davis | C04B 30/02 264/43 |
| 2003/0159423 A1 | | 8/2003 | Hietpas et al. | |
| 2003/0163907 A1 | | 9/2003 | Sakurai et al. | |
| 2004/0258732 A1 | | 12/2004 | Shikinami | |

(Continued)

FOREIGN PATENT DOCUMENTS

| EP | 0664351 | 7/1995 |
|---|---|---|
| JP | 61-10079 | 1/1986 |
| JP | 2-127553 | 5/1990 |
| JP | 6-280114 | 10/1994 |
| JP | 7-48179 | 2/1995 |
| JP | 10-130073 | 5/1998 |
| JP | 2000-143322 | 5/2000 |
| JP | 2001-254331 | 9/2001 |
| JP | 2003-159321 | 6/2003 |
| JP | 2005-60895 | 3/2005 |
| JP | 2006-225938 | 8/2006 |
| WO | 2005/001175 | 1/2005 |
| WO | 2008/099960 | 1/2008 |

*Primary Examiner* — Nahida Sultana
(74) *Attorney, Agent, or Firm* — Hamre, Schumann, Mueller & Larson, P.C.

(57) ABSTRACT

To provide an add-in material to be added to a porous molded body base, the add-in material being capable of developing a pore of appropriate size efficiently without degrading the formability and productivity of a porous molded body, particularly a porous fired body when producing the porous molded body. A shrinkable fiber composed of a thermoplastic resin and to be dispersed in a base of a porous molded body, particularly a porous fired body, wherein the shrinkable fiber has a fiber diameter of 10 to 40 μm, a fiber length of 1 to 20 mm, and a dry-heat shrinkage percentage of at least 8% when subjected to heat treatment at 80° C. for 5 minutes.

7 Claims, No Drawings

(56) References Cited

U.S. PATENT DOCUMENTS

| | | |
|---|---|---|
| 2006/0188719 A1 | 8/2006 | Selivansky |
| 2006/0251895 A1* | 11/2006 | Lambert .................. D01F 1/07 |
| | | 428/384 |
| 2007/0014987 A1 | 1/2007 | Usui et al. |
| 2007/0105707 A1* | 5/2007 | Ichikawa ........... B01D 39/2093 |
| | | 501/141 |
| 2008/0149561 A1* | 6/2008 | Chu ..................... A61L 15/425 |
| | | 210/500.38 |
| 2008/0251027 A1* | 10/2008 | Kirsch ................. A01K 1/0152 |
| | | 119/173 |
| 2009/0208699 A1 | 8/2009 | Miyauchi et al. |
| 2009/0217882 A1* | 9/2009 | Jenkins ............... A01K 1/0152 |
| | | 119/173 |
| 2009/0324947 A1 | 12/2009 | Nishitani et al. |
| 2010/0227166 A1 | 9/2010 | Miyauchi et al. |

\* cited by examiner

SHRINKABLE FIBER FOR POROUS MOLDED BODY

CROSS-REFERENCE TO RELATED APPLICATIONS

This application is a Continuation of application Ser. No. 12/675,533, filed Feb. 26, 2010, which is a U.S. National Stage of PCT/JP2008/066134, filed Sep. 1, 2008, which application is incorporated herein by reference.

BACKGROUND OF THE INVENTION

Technical Field

The present invention relates to a shrinkable fiber suitable for use in obtaining a porous molded body. More specifically, the present invention particularly relates to a fiber to be dispersed in a fired body base used in a porous fired body, and to a shrinkable fiber that is excellent in pore formability in a drying process prior to firing and in a firing process due to its capability of reducing degradation in moldability caused by addition of the fiber to the fired body base and exerting an appropriate heat shrinkage property.

Background Art

Fired bodies, such as earthenware, ceramics and refractory products, are widely used in daily necessities and industrial material applications. In recent years, lighter fired bodies have been required in order to improve portability and processability thereof in daily necessities and to prevent mass increase associated with enlargement of fired bodies in industrial material applications.

There have conventionally been a large number of technologies related to pore formation on a fired body, and Patent Literature 1, for example, describes a technology in which a globular hollow resin powder is added to a ceramic base and thus obtained product is burned down to thereby obtain a ceramic having pores. Also, Patent Literature 2 describes a technology in which an organic fiber is contained in a refractory raw material and thus obtained product is fired to obtain a porous refractory product.

[Patent Literature 1] Japanese Patent Application Publication No. 10-130073
[Patent Literature 2] Japanese Patent Application Publication No. 61-10079

DISCLOSURE OF INVENTION

As described above, there has been conducted a study for obtaining a porous fired body by adding a burnable component to a fired body base, but use of a large-size add-in material to obtain large-size pores will cause a decrease in fluidity and make molding of a porous fired body difficult. On the other hand, if the size of the add-in material is limited so as to prevent the degradation of moldability, neither satisfactory pores nor satisfactory results can be obtained.

Therefore, an object of the present invention is to provide an add-in material to be added to a fired body base, the add-in material being capable of developing a pore of appropriate size efficiently without degrading the formability and productivity of a porous molded body, particularly a porous fired body when producing the fired body.

The inventors of the present invention have conducted a keen experiment to achieve the above object and, as a result, have found out that a fiber with specific heat shrinkage property is suitable as an add-in material for obtaining a porous molded body, particularly for a fired body, that this shrinkable fiber-containing fired body base is excellent in moldability, and that when firing the shrinkable fiber-containing fired body base shrinkage force of the shrinkable fiber generated by heat acts on a fired body base as well and deforms so as to encompass the fired body base around the fiber to form a pore in the fired body base so that water evaporation can be conducted smoothly in a firing process, whereby a porous fired body with an excellent appearance without any cracks can be obtained. The inventors therefore ended up completing the present invention.

The present invention has the following configurations:

(1) A shrinkable fiber composed of a thermoplastic resin and to be dispersed in a porous molded body base, wherein the shrinkable fiber has a fiber diameter of 10 to 40 μm, a fiber length of 1 to 20 mm, and a dry-heat shrinkage percentage of at least 8% when subjected to heat treatment at 80° C. for 5 minutes.

(2) The shrinkable fiber according to the above (1), having a weight residual ratio of 10% or lower when heated at 500° C.

(3) The shrinkable fiber according to the above (1), which is a conjugate fiber obtained by conjugating a first component composed of a thermoplastic resin with a second component composed of a thermoplastic resin having a higher melting point than that of the first component, wherein the conjugate fiber has a weight residual ratio of 10% or lower when heated at 500° C.

(4) The shrinkable fiber according to the above (3), wherein the first component is a mixture of two or more types of thermoplastic resins, and at least one of the thermoplastic resins has a melting point of 100° C. or lower.

(5) The shrinkable fiber according to the above (3) or (4), wherein the centers of gravity of the conjugate components are different from each other in a fiber cross section.

(6) The shrinkable fiber according to any one of the above (1) to (5), wherein a moisture percentage of a fiber assembly is 5 to 50%.

(7) The shrinkable fiber according to any one of the above (1) to (6), having a standard moisture regain of 2% or less.

The shrinkable fiber according to the present invention has an excellent kneadability with the raw material of a fired body base and does not impair the moldability of a fired body base when the shrinkable fiber is dispersed into the fired body base to obtain a porous molded body, particularly a porous fired body. Moreover, since the shrinkable fiber according to the present invention has an excellent shrinkability in a low-temperature region where a molded body base, particularly a fired body base presents plasticity, a shrinkage force of the fiber acts on the fired body base and deforms so as to encompass the base around the fiber so that a pore of appropriate size can be formed efficiently in the fired body base. The pore that is formed in this manner exerts an effect of smoothly conducting water evaporation from the molded body base, particularly from the fired body base, prevents the occurrence of cracks during a firing process, and improves productivity in the drying or biscuit-firing step and the firing process. Furthermore, thus obtained molded body, particularly fired body, is porous and light in weight and characterized in having excellent heat insulating properties and the like.

BEST MODE FOR CARRYING OUT THE INVENTION

The shrinkable fiber of the present invention is suitably used in a molded body base which has plasticity during the stage of dispersion of the shrinkable fiber but is cured when dried or heated.

Hereinafter, the present invention is described in detail by using an example in which "a molded body" or "a molded body base" is particularly "a fired body" or "a fired body base," but the present invention is not limited to this embodiment.

The shrinkable fiber of the present invention that is used for obtaining a porous molded body has a fiber diameter in the range of 10 to 40 μm, or preferably 20 to 30 μm. For example, in order to obtain a porous fired body, first a composition is prepared to obtain a fired body base, moisture or the like is added thereto to obtain a base having fluidity, and then the base is molded into any shape. In this case, it is preferred that the fiber diameter of the shrinkable fiber added to the base be 40 μm or less in order to prevent the fiber from protruding from the surface of the molded body to deteriorate the appearance of the molded body. Moreover, it is preferred that the fiber diameter of the shrinkable fiber be 10 μm or more to prevent problems where the fiber gets entangled with another and cannot be mixed evenly with the base raw material or where the fluidity of the base is degraded to thereby impair the moldability of the base. It is more preferred that the fiber diameter of the shrinkable fiber be in the range of 20 to 30 μm in order to obtain an excellent moldability and productivity when molding the base into any shape and also to prevent the appearance of an obtained molded body from deteriorating.

The shrinkable fiber of the present invention that is used for obtaining a porous molded body has a fiber length in the range of 1 to 20 mm, or preferably 3 to 10 mm. It is preferred that the fiber length be 1 mm or longer because a sufficiently large shrunk length (fiber length×shrinkage percentage (%)÷100) is obtained by shrinking the shrinkable fiber and the shrinkable fiber deforms so as to encompass the molded body base around the fiber to form a large pore. Moreover, it is preferred that the fiber length be 20 mm or shorter in order to obtain uniform miscibility with the base raw material and base fluidity with sufficient moldability. It is more preferred that the fiber length be in the range of 3 to 10 mm in order to create an excellent balance among pore formability obtained by shrinking the fiber, and processability and productivity for obtaining a molded body.

The shrinkable fiber of the present invention that is used for obtaining a porous molded body has a dry-heat shrinkage percentage of at least 8%, preferably at least 10%, and more preferably at least 15% when subjected to heat treatment at 80° C. for 5 minutes. In order to form a pore in the molded body base by heat shrinking the shrinkable fiber, it is important to show a larger shrinkage percentage in a low-temperature region of 100° C. or lower. The molded body base, which contains moisture and is readily deformable with a small force, is subjected to heat treatment at temperature lower than final firing temperature in a drying or biscuit-firing process, after molded into any shape. In this process of heat treatment, the molded body base loses moisture, thereby reducing the fluidity. Specifically, before most of the moisture contained in the molded body base evaporates, or in other words in a state where the molded body base still has sufficient plasticity, the fiber is heat-shrunk, hence the shrinkage force of the fiber acts on the molded body base and shrinks so as to encompass the surrounding molded body base, whereby a large pore is formed. It is preferred that the shrinkable fiber have a dry-heat shrinkage percentage of at least 8% at 80° C. in order to achieve the effect of the present invention, which is to obtain a porous molded body by forming a pore of appropriate size by means of the shrinkage force of the fiber during the drying process that involves heating of the molded body base. It is more preferred that the dry-heat shrinkage percentage be at least 10% and more preferably at least 15% at 80° C. in order to form a larger pore efficiently. The greater the dry-heat shrinkage percentage of the shrinkable fiber of the present invention, the more effective the shrinkable fiber, and thus the upper limit of the dry-heat shrinkage percentage is not limited.

Note that the dry-heat shrinkage percentage of the shrinkable fiber of the present invention used for obtaining a porous molded body may be measured after cutting the shrinkable fiber into a fiber length of 1 to 20 mm, and may also be measured after cutting an uncut continuous tow into any length. The dry-heat shrinkage percentages that are measured by the above two methods are equal to each other within an error range.

The melting points of the thermoplastic resins composing the shrinkable fiber of the present invention used for obtaining a porous molded body are not particularly limited, but the lower the melting points, the higher the shrinkage percentages. Hence, the melting points are preferably 165° C. or lower, more preferably 130° C. or lower, and even more preferably 125° C. or lower. Examples of the thermoplastic resins having such range of melting points include ethylene copolymers such as ethylene-vinyl acetate copolymer, ethylene-methacrylic acid copolymer and ethylene-acrylate copolymer, elastomer resins such as poly-alpha-olefin and styrene-ethylene-butylene-styrene copolymer, low-density polyethylene, linear low-density polyethylene, high-density polyethylene, polypropylene, and propylene copolymers such as ethylene-propylene copolymer and ethylene-butene-propylene copolymer. Above all, considering the fiber formability and the cost of resins, ethylene-vinyl acetate copolymer, low-density polyethylene, ethylene-propylene copolymer, ethylene-butene-propylene copolymer and polypropylene are suitably used. In addition, these thermoplastic resins may be used independently, or a mixture of two or more of the thermoplastic resins may be used, hence use of the thermoplastic resins can be determined appropriately in accordance with the desired productivity and fiber shrinkage property.

The thermoplastic resins configuring the shrinkable fiber of the present invention used for obtaining a porous molded body may be added with, for example, an antioxidant, light stabilizer, ultraviolet absorber, neutralizer, nucleating agent, lubricant, antibacterial agent, deodorant, fire retardant, antistatic, pigment, plasticizer, and other additives for exerting various performances according to need without obstructing the effect of the present invention.

The shrinkable fiber of the present invention that is used for obtaining a porous molded body may be a monocomponent fiber composed of one component of thermoplastic resin, or a multicomponent fiber wherein two or more components of thermoplastic resins are conjugated. However, in order to improve the heat shrinkability of the fiber and to obtain a highly shrinkable fiber at a high productivity, it is desirable that the shrinkable fiber be a conjugate fiber obtained by conjugating a first component composed of a thermoplastic resin with a second component composed of a thermoplastic resin having a lower melting point than that of the first component. Although it is effective to make a thermoplastic resin having a low melting point into a fiber in order to obtain a highly shrinkable fiber, the crystallization speed of the thermoplastic resin having a low melting point is generally so slow that broken yarn is generated frequently when spinning yarn, causing degradation of processability and productivity. Moreover, due to the low resin strength of the fiber composed of the thermoplastic resin having a low melting point, the fiber lacks in stiffness and there is a problem that, when adding the shrinkable fiber to a base and kneading them, the fiber becomes entangled with another easily. In order to solve these problems, it is preferred that the shrinkable fiber of the present invention be a conjugate fiber obtained by conjugating a first component composed of a thermoplastic resin with a second component composed of a thermoplastic resin having a higher melting point than that of the first component. Although the melting point of the second component of the conjugate fiber is not particularly limited, the melting point of the second component is higher than that of the first component and is preferably in the range of 120 to 180° C. and more preferably 155 to 165° C. in order to maintain sufficient spinnability and provide an appropriates stiffness to the fiber. In addition, although the melting point of the first component of the conjugate fiber is not particularly limited, the melting point of the first component is lower than that of the first component and is preferably in the range of 60 to 130° C. and more preferably 70 to 110° C. When the melting point of the first component is 130° C. or lower the shrinkability of the conjugate fiber can be improved in a low temperature region, and when the melting point of the first component is 60° C. or higher the processability can be prevented from being degraded by the stickiness of the low-melting point resin. It is preferred that the melting point of the first component be in the range of 70 to 110° C. in order to create an excellent balance between the shrinkability and processability in the low temperature region. A combination of the thermoplastic resins of the first and second components is not particularly limited and thus can be selected appropriately in consideration of the balance among a desired shrinkage property, spinnability, processability and stiffness of the fiber, hence the possible examples of the combination are low-density polyethylene/polypropylene, linear low-density polyethylene/polypropylene, ethylene-vinyl acetate copolymer/polypropylene, ethylene-methacrylic acid copolymer/polypropylene, propylene copolymer/polypropylene, low-density polyethylene/propylene copolymer, ethylene-vinyl acetate copolymer/propylene copolymer, and ethylene-methacrylic acid copolymer/propylene copolymer.

When the shrinkable fiber of the present invention is the conjugate fiber obtained by conjugating the first component composed of a thermoplastic resin with the second component composed of a thermoplastic resin having a higher melting point than that of the first component, although not limited, it is desirable that the first component be a mixture of at least two types of thermoplastic resins, and that at least one of the thermoplastic resins have a melting point of 100° C. or lower. It is known that a fiber composed of a thermoplastic resin heat-shrinks significantly at a temperature near the melting point of the resin. It is important for the shrinkable fiber of the present invention to shrink significantly in, for example, a low temperature region of 100° C. or lower where most of the moisture contained in the fired body base does not yet evaporate, or in other words where the fired body base still has sufficient plasticity, and then to extend the shrinkage force of the shrinkable fiber over the fired body base around the fiber to form a pore. Based on this perspective, it is desirable that the shrinkable fiber of the present invention contains a thermoplastic resin having a melting point of 100° C. or lower and shrink easily at low temperature. Although it is not a problem even when the first component is composed only of the thermoplastic resin having a melting point of 100° C. or lower, it is desirable that the first component be a mixture of a thermoplastic resin having a melting point in the range of 100 to 130° C. and more preferably 100 to 110° C. and a thermoplastic resin having a melting point in the range of 60 to 100° C. and more preferably 70 to 90° C. in order to prevent the processability and productivity from being degraded by the stickiness of the low-melting point resins during a yarn-making process. In this case, although the constituent ratio of the thermoplastic resin having a melting point of 100° C. or lower in the first component is not particularly limited, it is preferably in the range of 10 to 60 wt % and more preferably 20 to 40 wt %. When the constituent ratio of the thermoplastic resin having a melting point of 100° C. or lower is at least 10 wt %, the effect of increasing the shrinkage percentage of the shrinkable fiber can be obtained sufficiently, and when the constituent ratio is 60% or less the surface of the fiber does not become excessively sticky, hence a satisfactory processability and productivity can be achieved. The constituent ratio in the range of 20 to 40 wt % is particularly preferable because an excellent balance can be achieved between the shrinkability and productivity of the fiber.

When the shrinkable fiber of the present invention is the conjugate fiber obtained by conjugating the first component composed of a thermoplastic resin with the second component composed of a thermoplastic resin having a higher melting point than that of the first component, although a conjugation pattern is not particularly limited and cross-sectional structure configured by a concentric sheath-core type, eccentric sheath-core type, side-by-side, splittable type or sea-island type cross section structure is possible, a conjugation pattern in which the centers of gravity of conjugate components are different from each other in a fiber cross section is preferred in order to improve the heat shrinkability of the fiber, and examples of such a pattern include an eccentric sheath-core type and side-by-side conjugation patterns. In the case of a conjugation pattern in which the centers of gravity of the conjugate components are different from each other in the fiber cross section, three-dimensional crimps such as spiral, Q-shape crimps and the like are generated due to the difference in heat shrinkage percentage between the conjugate components. This means that not only shrinkage of actual fiber length but also shrinkage of apparent fiber length occurs, and this conjugation pattern is preferred because a change in the three-dimensional shape of the fiber affects the fired body base surrounding the fiber and the fiber shrinks so as to encompass the surrounding fired body base, whereby the size of the pore increases, leading to efficient formation of the pore.

When the shrinkable fiber of the present invention that is used for obtaining a porous molded body is the conjugate fiber obtained by conjugating the first component composed of a thermoplastic resin with the second component composed of a thermoplastic resin having a higher melting point than that of the first component, the conjugate area ratio of the first component/the second component is not particularly limited, but it is preferred that the conjugate area ratio be in the range of 70/30 to 40/60 and more preferably 65/35 to 55/45. When the ratio of the second component is 30% or more, the number of yarn breakages in spinning chops, whereby high productivity can be obtained. Moreover, when the ratio of the first component is 40% or more, the shrinkage percentage of the conjugate fiber increases, whereby a pore of appropriate size can be formed efficiently. It is even more preferred that the conjugate area ratio of the conjugate fiber be in the range of 65/35 to 55/45 because an excellent balance can be achieved between the productivity and shrinkage percentage of the fiber.

The fiber cross-sectional shape of the shrinkable fiber of the present invention is not particularly limited, and thus a round shape such as a circle or an ellipse, an angular shape such as a triangle or a square, a non-circular shape such as a key shape or an octalobe shape, a hollow shape, or any other shape can be used.

The molded body base or, for example, a fired body base to which the shrinkable fiber of the present invention is added is molded into any shape, subjected to the drying or biscuit-firing process at relatively low temperature, and thereafter fired at high temperature. The shrinkable fiber of the present invention heat-shrinks in the course of increasing the temperature in the drying or biscuit-firing process, deforms so as to encompass the fired body base around the fiber, and produces a pore. Since the fiber is not particularly necessary after the pore is formed, it is desirable that the fiber be burned down at high temperature during the firing process. Based on this perspective, the weight residual ratio obtained when heating the shrinkable fiber of the present invention at 500° C. is, although not particularly limited, preferably 10% or less and more preferably 5% or less. When the weight residual ratio is 10% or less, the problems such as detracted appearance and an abnormal odor generated by residual carbide of the fiber in an end product are prevented. A weight residual ratio of 5% or less is desirable because the above problems can be solved at a higher level. In order to achieve such weight residual ratios, it is desirable to use a thermoplastic resin that is not carbonized easily but thermally decomposed easily at the time of firing. Examples of such thermoplastic resin include ethylene copolymers such as ethylene-vinyl acetate copolymer, ethylene-methacrylic acid copolymer and ethylene-acrylate copolymer, elastomer resins such as poly-alpha-olefin and styrene-ethylene-butylene-styrene copolymer, low-density polyethylene, linear low-density polyethylene, high-density polyethylene, polypropylene, and olefin copolymers such as ethylene-propylene copolymer and ethylene-butene-propylene copolymer.

The shrinkable fiber of the present invention is added to a composition prepared as the molded body base or, for example, the fired body base, and thereafter kneaded evenly. The shrinkable fiber assembly is preferably in a wet state with a dispersive fiber treating agent applied thereto, rather than a dry state, because the fibers can be separated one by one in the wet state, thereby improving kneadability. Therefore, the moisture percentage of the fiber assembly is, although not particularly limited, preferably set in the range of 5 to 50% and more preferably 15 to 40% by adjusting the amount of the dispersive fiber treating agent applied to the fibers. Here, the moisture percentage of the fiber assembly does not mean the moisture contained in the fibers themselves, but a mass fraction of moisture retained on a fiber surface or in a gap between the fibers. When the moisture percentage of the fiber assembly is 5% or more, it is possible to prevent a problem in which the fibers are scattered when added to the fired body base, improving the spreading property of the fibers, hence the fibers are evenly mixed with the fired body base so that a homogenous porous fired body is obtained efficiently. Moreover, when the moisture percentage of the fiber assembly is 50% or less, handling ability and processability are prevented from being degraded by the increase in the mass due to the moisture. It is preferable that the moisture percentage of the fiber assembly be in the range of 15 to 40% in order to achieve an excellent balance among the effect of improving the kneadability, handling ability and processability.

Temperatures and speeds of temperature increase are important in the process of drying or biscuit-firing the obtained molded body base or, for example, the fired body base. When the temperature is too high or the speed of temperature increase is too fast, the moisture evaporates drastically and consequently water vapor is generated in large quantity, causing a crack or large pore in the molded fired body base. In other words, when the fired body base contains an excessive amount of moisture, the fired body base has to be dried or biscuit-fired under a temperate condition, otherwise a crack or large pore is generated in the product, causing degradation of the productivity and product quality. The moisture that is contained in the fiber assembly at a stage prior to the stage of adding the fibers to the fired body base may exert the effect of improving the processability in the kneading process, and the amount of moisture to be added to the fired body base is determined in consideration of the amount of moisture contained in the fiber assembly, so that an excessive amount of moisture is not provided. However, the moisture contained in each fiber itself, or in other words the moisture expressed in standard moisture regain, does not contribute to the improvement of the processability of the kneading process but only delays the evaporation of the moisture in the drying or biscuit-firing process and degrades the productivity. Based on this perspective, the standard moisture regain of the shrinkable fiber of the present invention is, although not particularly limited, preferably 2% or less and more preferably 1% or less. When the standard moisture regain is 2% or less, the set temperature can be increased or the speed of temperature increase can be increased in the drying or biscuit-firing process so that the process can be ended in a short time, leading to high productivity. It is preferred that the standard moisture regain be 1% or less in order to achieve higher productivity.

The shrinkable fiber of the present invention that is used for obtaining a porous molded body can be spun by means of a regular melt spinning apparatus. Spinning condition, such as spinning temperature and pull-up speed, can be appropriately selected in accordance with the characteristics of the thermoplastic resins used as the raw materials and desired fiber characteristics, and the spinning speed can be in the range of, for example, 180 to 350° C. and the pull-up speed can be in the range of, for example, 300 to 1500 m/min. When pulling up a fibrous resin discharged from a spinning nozzle by means of a winder, it is preferable to cool the fibrous resin in a medium such as air, water, or glycerin so that a spinning process can be performed stably. Above all, it is preferable to use a cooling method using air because the cooling can be performed in the simplest apparatus.

Melt flow rate (MFR) of each of the thermoplastic resins used as the raw materials is, although not particularly limited, in the range of preferably 5 to 100 g/10 min, more preferably 10 to 60 g/10 min, or even more preferably 15 to 40 g/10 min, at 230° C. When the MFR of the thermoplastic resin is 5 g/10 min or more, resin fluidity that is suitable for melt spinning can be obtained, whereby the resin can be evenly discharged from the spinning nozzle and thereby the spinning process is performed stably. Moreover, when the MFR is 100 g/10 min or less, an appropriate tension acts in the course of gulling up the fiber, hence the number of yarn breakages is reduced and the spinning process is performed stably. When the MFR is 10 to 60 g/10 min, satisfactory stability can be achieved in the spinning process, and it is preferred that the MFR be 15 to 40 g/10 min to obtain sufficient stability in the spinning process.

Next is described a method of drawing the shrinkable fiber of the present invention that is used for obtaining a porous molded body. For this drawing method, although not particularly limited, any known drawing method may be adopted, and examples thereof include a method of drawing by heating the fiber using a metallic heating roller or metallic heating plate in a contact manner, and a method of drawing by heating the fiber using heated water, boiled water, pressurized saturated vapor, hot air, far-infrared radiation, microwave, or carbon dioxide gas laser in a non-contact manner. Above all, it is preferable to draw the fiber by using the metallic heating roll or heated water, in consideration of the easiness, ease of operation and productivity of the apparatus.

Because the shrinkage percentage of the fiber is prone to increase when drawing the fiber at low power, the draw ratio is, although not particularly limited, preferably 2.5 or lower, and more preferably 2.0 or lower. When the draw ratio is 2.5 or lower a satisfactory shrinkability is obtained, and when the draw ratio is 2M or lower a sufficient shrinkability is obtained. Also, because the shrinkage percentage of the fiber is prone to increase when the fiber is drawn at low temperature, the drawing temperature is, although not particularly limited, preferably 80° C. or lower and more preferably 60° C. or lower. When the drawing temperature is 80° C. or lower a satisfactory shrinkability is obtained, and when the drawing temperature is 60° C. or lower a sufficient shrinkability is obtained. Note that when the drawing temperature is too low, a yarn breakage occurs easily at the time of drawing, but since the draw ratio of the shrinkable fiber of the present invention is set to be low, yarn breakage during drawing is not a problem.

The drawing speed is, although not particularly limited, preferably 50 m/min or higher and more preferably 100 m/min or higher in consideration of the productivity. Because the draw ratio of the shrinkable fiber of the present invention is set to be relatively low, increasing the drawing speed does not cause the problem of yarn breakage. Furthermore, single-stage drawing or multi-stage drawing consisting of two or more stages may be performed in the drawing process, and when performing the multi-stage drawing the drawing methods using the abovementioned heating roller, heated water and the like can be combined.

Whether the shrinkable fiber of the present invention used for obtaining a porous molded body has crimps or not is not particularly restricted, but it is preferred that the shrinkable fiber be a straight fiber that is not provided with any zigzag mechanical crimps or Ω-shape or spiral three-dimensional crimps. It is not a problem that the shrinkable fiber to have latent crimps, and that it is exposed after, for example, the shrinkable fiber is added to the fired body base and molded to form a pore, but when the crimps are apparently exposed at a stage prior to the stage of adding the shrinkable fiber to the fired body base, the fiber tends to become entangled during the process of kneading the fired body base and fibers. Therefore, it is desirable that the shrinkable fiber of the present invention be a straight fiber without any obvious crimps, and it is more desirable that the shrinkable fiber be a straight fiber with latent crimps.

In the shrinkable fiber of the present invention, a fiber treating agent can be adhered to the fiber surface so that the spinning and drawing processes can be performed stably or in order to fulfill product characteristics. The types of fiber treating agents are not particularly limited and can be selected appropriately in consideration of, for example, compatibility with the fired body base. Moreover, the adhesion amount is not particularly limited and can be set to a desired adhesion amount by adjusting the concentration of pure fiber treating agent in consideration of the moisture percentage of the fiber assembly described above. The method of adhesion is not particularly limited and therefore a known method such as, for example, a roller method, a dipping method, an atomization method or a pat-dry method can be selected appropriately.

The shrinkable fiber of the present invention that is used for obtaining a porous molded body is drawn and thereafter cut into a fiber length of 1 to 20 mm as described above. The method of cutting the drawn fiber is not particularly limited and therefore a known method such as, for example, a rotary cutting system or a guillotine cutting system can be adopted.

The shrinkable fiber of the present invention that is used for obtaining a porous molded body is added to the raw materials configuring the molded body base, and kneaded and evenly dispersed while adding water thereto to obtain an appropriate fluidity. The water content of the molded body base obtained after adding water is not particularly limited, can be appropriately selected in accordance with the type of base material to be used, the type of shrinkable fiber to be added, and the additive amount, and can be adjusted to obtain a desired fluidity. For example, the flow property of the fired body base is also not particularly limited and can be appropriately selected in accordance with the difference among the molding methods such as a mechanical wheel, hand forming method, rolling molding method and extrusion molding method, or the difference among the methods for executing casting, spraying, stamping and the like. The moisture percentage of the fired body base suitable in various molding methods or construction methods can be, for example, in the range of 3 to 50%.

The mass fraction of the shrinkable fiber in the molded body base composition is not particularly limited and can be appropriately selected in accordance with the nature of the raw materials used in the molded body base, characteristics of a desired molded body and the fiber length of the shrinkable fiber. However, it is not preferred that the ratio of the shrinkable fiber is too high because the fiber becomes entangled with another easily, uneven dispersion of the fiber is caused, or the moldability of the molded body base becomes deteriorated. Moreover, it is not preferred that the ratio of the shrinkable fiber is too low because it makes it impossible to achieve the effect of the present invention, which is to heat and cause the fiber to shrink when drying or biscuit-firing the molded body base, and then to form a pore by means of the shrinkage force of the fiber so that a porous fired body can be obtained. Base on this perspective, an appropriate mass fraction in the shrinkable fiber of the molded body base composition is, for example, in the range of 0.05 to 10% based on dry mass. In addition, it is not a problem that a pore forming material other than the shrinkable fiber is also used and added to the molded body base composition within the scope that does not impede the effect of the present invention.

The types of raw materials configuring the molded body base is not particularly limited, and examples thereof include earthenware made of clay or colored clay, refractory products made of alumina or the like, and other fired bodies that may use any compositions of raw materials. Furthermore, a cement molded body made of portland cement or the like is even preferred in processes of drying and curing and particularly in those processes involving heating, and such cement molded body can be used for shrinking the shrinkable fiber of the present invention to achieve the effect of the present invention, although this cement molded body does not fall into the categories of the fired bodies because it is not subjected to the firing process. Moreover, in the case of the cement molded body to which the shrinkable fiber of the present invention is added, it was possible to confirm the effect of preventing explosive fracture caused by a fire of the cement molded body, as described in, for example, Japanese Patent Application Publication No. 2000-143322. This is attributed to the mechanism in which the shrinkable fiber of the present invention is destroyed by the hot temperature during the fire, then pores are formed in the cement molded body, and water vapor generated by the fire escapes from the pores to the outside. The weight residual ratio of the shrinkable fiber of the present invention is low and is 10% or less when heated at 500° C. so that pores can be formed efficiently, hence the shrinkable fiber of the present invention can be used suitably as a fiber to be added in order to obtain a highly fire-resistant concrete molded body.

When the shrinkable fiber of the present invention is added to a molded body base or, for example, a fired body base, the shrinkage force of the shrinkable fiber generated by heat acts on the fired body base as well and deforms so as to encompass the fired body base to form a pore in the fired body base. However, in order to efficiently form a pore on the fired body base by means of the shrinkage force, it is preferred that dry shrinkage percentage of the fired body base be sufficiently low in relation to the shrinkage percentage of the fiber, based on which the temperature of the fired body base without the shrinkable fiber is raised to 150° C. at a the speed of temperature increase of 1° C./min so that the dry shrinkage percentage obtained after holding the fired body base for 30 minutes becomes preferably 10% or lower, or more preferably 7% or lower. It is preferred that the dry shrinkage percentage of the fired body base be 10% or lower to form the pore by shrinking the shrinkable fiber of the present invention, but it is more preferred that the dry shrinkage percentage be 7% or lower in order to form the pores more efficiently. Furthermore, the larger the difference in shrinkage percentage between the shrinkable fiber and the fired body base during heat treatment, the more efficiently the pore is formed. Although unable to completely compare the shrinkage percentages due to the difference in the heat treatment conditions, the shrinkage percentage of the shrinkable fiber of the present invention that is obtained when heat processing is preformed at 80° C. for 5 minutes is preferably larger than the dry shrinkage percentage of the fired body base, and the difference therebetween ([shrinkage percentage of the shrinkable fiber]−[dry shrinkage percentage of the fired body base]) is preferably large.

The molded body base, particularly the fired body base added with the shrinkable fiber of the present invention is dried or biscuit-fired after molded into any shape, and then further fired at high temperature. In so doing, temperature conditions and the like are not particularly limited, and thus they can be selected appropriately in accordance with the nature of the raw materials used in the fired body base, the moisture percentage of the fired body base, and the physical property of a desired fired body. The shrinkable fiber of the present invention has an excellent shrinkability in a low-temperature region. In addition, the fired body base presents plasticity when containing moisture, but the plasticity is gradually reduced once the moisture evaporates. Based on these perspectives, it is preferred that the shrinkable fiber of the present invention be shrunk while the plasticity of the fired body base is sufficiently high in order to form a pore of appropriate size efficiently, hence it is effective to increase the time of the heat treatment in a region where the temperature is as low as, for example, 80 to 150° C. The porous fired body obtained in this manner is lighter than the fired body obtained by the conventional method, has excellent handling ability and heat insulating properties, and thus the porous fired body can be suitably used in, for example, a tea cup and the like.

When the firing temperature is set high or the speed of temperature increase is too fast, the moisture contained in the fired body base evaporates drastically, causing a crack or rupture in the molded fired body, but the fired body base added with the shrinkable fiber of the present invention has the effect of forming a pore by shrinking the shrinkable fiber and thereby conducting water evaporation smoothly. Therefore, use of the shrinkable fiber of the present invention can lessen the occurrence of defective products having cracks or the like caused by the water evaporation, and can improve productivity by reducing the time required in the firing process subsequent to the drying or biscuit-firing process.

The final firing temperature of the fired body base added with the shrinkable fiber of the present invention is not particularly limited and thus can be selected appropriately in accordance with the nature of the raw materials used in the fired body base and the physical property of the desired fired body, but it is preferred that the final firing temperature be at least 700° C. and more preferably at least 1000° C. When the final firing temperature is 700° C. or higher, the shrinkable fiber of the present invention does not remain in the fired body in the form of carbide and the like, whereby the problem of deterioration of the appearance of the fired body does not occur. It is more preferred that the final firing temperature be 1000° C. or higher in order to further reduce the amount of shrinkable fiber remaining in the fired body.

EXAMPLES

The present invention will now be described hereinafter in detail by using examples, but the present invention is not limited to these examples.

Examples 1 to 7 and Comparative Examples 1 to 5

A variety of shrinkable fibers were prepared using various thermoplastic resins, and thus obtained shrinkable fibers were added to a molded body base to manufacture a molded body. Note that the method for measuring the physical property values shown in the examples or the definition of physical property value is shown hereinafter along with the operation performed in each example. Table 1 below shows the conditions, the obtained physical property values and results.

(1) Spinnability

Spinnability that is obtained when preparing the fibers using the thermoplastic resins was evaluated on a scale of four levels with ⓧ, O, Δ and x.

ⓧ . . . The number of times that cut yarn is generated when spinning the yarn for six hours in a row is 0.

O . . . The number of times that cut yarn is generated when spinning the yarn for six hours in a row is 1 to 6.

Δ . . . The number of times that cut yarn is generated when spinning the yarn for six hours in a row is 7 to 12.

x . . . The number of times that cut yarn is generated when spinning the yarn for six hours in a row is 13 or more.

(2) Dry-Heat Shrinkage Percentage

The shrinkable fibers were heat-treated at 80° C. in a circulation oven for five minutes, and the dry-heat shrinkage percentages of the shrinkable fibers were calculated by the following equation. The average value was obtained by the number of specimens (N=20). Note that, for those short shrinkable fibers having a fiber length of 1 to 20 mm, images of the heat-treated and non-heat-treated fibers were scanned using a 3D Digital Fine Scope VC2400-IMU (manufactured by OMRON Corporation), and the fiber length of the heat-treated and non-heat-treated fibers were measured.

Dry-heat shrinkage percentage (%)=(Non-heat-treated fiber length−Heat-treated fiber length)÷Non-heat-treated fiber length×100

(3) Weight Residual Ratio

A simultaneous differential scanning calorimeter (TG/DTA200) manufactured by Seiko Instruments Inc. was used to perform measurement under the conditions of sample mass of 6 to 7 mg and speed of temperature increase of 10° C./min, and the weight residual ratio at 500° C. was obtained.

(4) Moisture Percentage of a Fiber Assembly

Approximately 100 g of an assembly of fibers cut into any length was collected, and this fiber assembly was dried at 80° C. in the circulation oven for three hours to calculate the moisture percentage of the fiber assembly using the following equation.

Moisture percentage of fiber assembly (%)=(Mass of non-dried fiber assembly−Mass of dried fiber assembly)/Mass of dried fiber assembly×100

(5) Standard Moisture Regain of the Fibers

Numeric values of JIS-L-1030 were used to calculate the standard moisture regain of the fibers.

(6) Melt Flow Rate (MFR) of the Thermoplastic Resins

The melt flow rate of the thermoplastic resins were measured at a test temperature of 230° C. and a test load of 21.18 N (Test condition 14 of JIS-K-7210 "Table 1").

(7) Preparation of a Fiber-Added Molded Body Base, and its Kneadability and Moldability To dried powder of the raw materials of an earthenware fired body that mainly contains granite powder and kibushi clay powder, 5% by mass of fibers on dry basis was added, thus obtained product was then kneaded while adding water thereto to obtain 25% of water content, and thereafter a tea bowl was formed using a mechanical wheel. How the fibers were dispersed in the molded body base, the number of entangled fibers, uniformity and moldability on the mechanical wheel were evaluated on a scale of four levels with ⓧ, O, Δ and x.

ⓧ . . . The fibers were dispersed sufficiently without any entangled fibers, and the uniformity and moldability were particularly excellent.

O . . . The fibers were dispersed at a satisfactory level with almost no entangled fibers, and the uniformity and moldability were excellent.

Δ . . . The fibers were dispersed at a tolerable level. There were a small number of entangled fibers but the uniformity and moldability were obtained at a tolerable level.

x . . . The fibers were dispersed extremely disproportionately with many entangled fibers, and the uniformity and moldability were poor.

(8) Firing Method, the Appearance of the Fired Body and the Formability of Pores In an electric furnace that is heated up to 150° C. at a speed of temperature increase of 1° C./min, the molded tea bowl was held for 30 minutes to perform the drying process, and thereafter the electric furnace was heated up to 1200° C. at 1° C./min to fire the tea bowl. The appearance of the obtained fired body was evaluated on a scale of four levels with ⓧ, O, Δ and x. The moisture was absorbed by a boiling method, the bulk specific gravity was measured by an Archimedes method, and the results were used as the indicators of the formability of pores.

ⓧ . . . No cracks or carbides observed, with uniform and sufficient level of appearance.

O . . . There were few cracks or carbides, but uniform and satisfactory appearance was obtained.

Δ . . . There were a few cracks or carbides and nonuniformity attributable to disproportion of fibers was observed, but a tolerable level of appearance was obtained.

x . . . A large crack and many carbides were observed, and extremely poor appearance was obtained.

Example 1

An ethylene-butene-propylene copolymer having a melting point of 130° C. and MFR of 16 g/10 min was subjected to melt-spinning. The number of times that cut yarn was generated when spinning the ethylene-butene-propylene copolymer for six hours in a row was 0, meaning that sufficient spinnability was obtained. Thus obtained undrawn yarn was drawn at a draw ratio of 2.4 at 30° C. with a hot roll drawing machine, and thereby a drawn yarn having a fiber diameter of 21 μm was obtained. The weight residual ratio of this yarn was 2% and the dry-heat shrinkage percentage was 12% at 80° C., presenting high shrinkability. This shrinkable fiber was cut into 5 mm to obtain a fiber assembly having a moisture percentage of 26%. The kneadability of this shrinkable fiber with respect to the fired body base was good, and the moldability with respect to the tea bowl was also good. When the molded tea bowl was fired by means of the abovementioned method, a porous fired body with extremely good appearance was obtained and the bulk specific gravity thereof was 1.4. Since the bulk specific gravity of a fired body that is obtained without adding the shrinkable fiber thereto was 2.1 as shown in the following Comparative Example 1, it is understood that adding the shrinkable fiber made the fired body porous.

Comparative Example 1

Only the fired body base was kneaded and molded without adding the fiber thereto, to obtain a fired body. Although the kneadability and moldability were extremely good, the obtained fired body was cracked and thus the appearance thereof was extremely poor. This crack is attributed to the fact that the moisture contained in the fired body base has evaporated drastically under the abovementioned firing conditions. No more cracks were generated by lowering the drying temperature and reducing the speed of temperature increase, but this has reduced the productivity of the drying and firing processes. Moreover, the bulk specific gravity of the fired body was 2.1, which caused a feeling of heaviness in a hand.

Example 2

A low-density polyethylene having a melting point of 102° C. and MFR of 23 g/10 min was subjected to melt-spinning. Yarn breakages occurred frequently during spinning, and the number of times that cut yarn was generated when spinning the low-density polyethylene for six hours in a row was 8, but an undrawn yarn was obtained with tolerable productivity. This undrawn yarn was drawn at a draw ratio of 2.0 at 50° C. with the hot roll drawing machine, and thereby a drawn yarn having a fiber diameter of 34 μm was obtained. The weight residual ratio of this yarn was 4% and the dry-heat shrinkage percentage was 37% at 80° C., presenting high shrinkability. This shrinkable fiber was cut into 15 mm to obtain a dry fiber assembly having a moisture percentage of 0%. When this fiber assembly was added to the fired body base, scattering fibers were observed. Although the fibers were entangled with each other, a tolerable level of kneadability was obtained in the fired body base composition, and the moldability and plasticity with respect to the tea bowl were slightly low but obtained at a moldable level. When the molded tea bowl was fired by means of the abovementioned method, nonuniformity attributable to disproportion of the scattered fibers was observed insignificantly, but an extremely porous fired body having a bulk specific gravity of 1.0 was obtained.

Example 3

A low-density polyethylene having a melting point of 102° C. and MFR of 23 g/10 min was arranged in a first component, a polypropylene having a melting point of 160° C. and MFR of 16 g/10 min was arranged in a second component, and these were conjugated in a conjugation pattern of sheath/core=first component/second component=40/60 and subjected to melt-spinning. By arranging the polypropylene in the core component, the spinnability has improved significantly, and the number of times that cut yarn was generated was 0, hence an undrawn yarn was obtained with sufficient productivity. This undrawn yarn was drawn at a draw ratio of 1.8 at 50° C. with a hot water drawing machine, and thereby a drawn yarn having a fiber diameter of 25 μm was obtained. The weight residual ratio of this yarn was 3% and the dry-heat shrinkage percentage was 12% at 80° C., presenting high shrinkability. This shrinkable fiber was cut into 5 mm to obtain a fiber assembly having a moisture percentage of 30%. The kneadability of this shrinkable fiber with respect to the fired body base was extremely good, and the moldability was also good. When the molded tea bowl was fired by means of the abovementioned method, a homogeneously porous fired body was obtained and the bulk specific gravity thereof was 1.2.

Example 4

A low-density polyethylene having a melting point of 102° C. and MFR of 35 g/10 min was arranged in the first component, a polypropylene having a melting point of 160° C. and MFR of 16 g/10 min was arranged in the second component, and these were conjugated in a conjugation pattern of sheath/core=first component/second component=40/60 and subjected to melt-spinning. The number of times that cut yarn was generated was 0, hence an undrawn yarn was obtained with sufficient productivity. This undrawn yarn was drawn at a draw ratio of 2.2 at 60° C. with the hot roll drawing machine, and thereby a drawn yarn having a fiber diameter of 23 μm was obtained. The weight residual ratio of this yarn was 3% and the dry-heat shrinkage percentage was 9% at 80° C. This shrinkable fiber was cut into 5 mm to obtain a fiber assembly having a moisture percentage of 30%. The kneadability of this shrinkable fiber with respect to the fired body base was extremely good, and the moldability was also good. When the molded tea bowl was fired by means of the abovementioned method, a homogeneously porous fired body was obtained and the bulk specific gravity thereof was 1.6.

Example 5

A substance that is obtained by mixing a low-density polyethylene having a melting point of 106° C. and MFR of 42 g/10 min with an ethylene-vinyl acetate copolymer having a melting point of 83° C., a vinyl acetate content of 20%, and MFR of 35 g/10 min at a mass fraction of 75/25 was arranged in the first component, polypropylene having a melting point of 160° C. and MFR of 16 g/10 min was arranged in the second component, and these were conjugated in a conjugation pattern of sheath/core=first component/second component=50/50 and subjected to melt-spinning. The number of times that cut yarn was generated was 5, hence a satisfactory level of spinnability was obtained. This undrawn yarn was drawn at a draw ratio of 1.8 at 50° C. with the hot water drawing machine, and thereby a drawn yarn having a fiber diameter of 25 μm was obtained. The weight residual ratio of this yarn was 4% and the dry-heat shrinkage percentage was 16% at 80° C., presenting high shrinkability. This shrinkable fiber was cut into 5 mm to obtain a fiber assembly having a moisture percentage of 25%. The kneadability of this shrinkable fiber with respect to the fired body base was extremely good, and the moldability was also good. When the molded tea bowl was fired by means of the abovementioned method, a homogeneously porous fired body was obtained and the bulk specific gravity thereof was 1.0.

Example 6

A low-density polyethylene having a melting point of 102° C. and MFR of 23 g/10 min was arranged in the first component, an ethylene-butene-propylene copolymer having a melting point of 130° C. and MFR of 16 g/10 min was arranged in the second component, and these were conjugated in a conjugation pattern of sheath/core=first component/second component=50/50 and subjected to melt-spinning. The number of times that cut yarn was generated was 3, hence a satisfactory level of spinnability was obtained. This undrawn yarn was drawn at a draw ratio of 1.6 at 40° C. with the hot water drawing machine, and thereby a drawn yarn having a fiber diameter of 38 μm was obtained. The weight residual ratio of this yarn was 2% and the dry-heat shrinkage percentage was 28% at 80° C., presenting high shrinkability. This shrinkable fiber was cut into 3 mm to obtain a fiber assembly having a moisture percentage of 20%. The kneadability of this shrinkable fiber with respect to the fired body base was extremely good, and the moldability was also very good. When the molded tea bowl was fired by means of the abovementioned method, a homogeneously porous fired body was obtained and the bulk specific gravity thereof was 1.0.

Example 7

A low-density polyethylene having a melting point of 102° C. and MFR of 31 g/10 min was arranged in the first component, a polypropylene having a melting point of 160° C. and MFR of 16 g/10 min was arranged in the second component, and these were conjugated in a conjugation pattern of first component/second component=50/50 and subjected to melt-spinning by using a side-by-side nozzle. When the cross section of the obtained fiber was checked, the fiber was formed such that the high-flow first component with encompasses the second component, and the number of times that cut yarn was generated was 0, hence a sufficient level of spinnability was obtained. This undrawn yarn was drawn at a draw ratio of 1.6 at 40° C. with the hot water drawing machine, and thereby a drawn yarn having a fiber diameter of 38 μm was obtained. The weight residual ratio of this yarn was 2% and the dry-heat shrinkage percentage was 28% at 80° C., presenting high shrinkability. Due to the difference in shrinkage percentage between these components, three-dimensional spiral crimps were generated during the heat treatment. This shrinkable fiber was cut into 3 mm to obtain a fiber assembly having a moisture percentage of 20%. The kneadability of this shrinkable fiber with respect to the fired body base was extremely good, and the moldability was also very good. When the molded tea bowl was fired by means of the abovementioned method, a homogeneously porous fired body was obtained and the bulk specific gravity thereof was 0.9. It is estimated that the size of the pore has increased due to the developing power of the spiral crimps on the shrinkable fiber.

Comparative Example 2

A polyethylene terephthalate having a melting point of 260° C. and an IV value of 0.64 was subjected to melt-spinning. A sufficient level of spinnability was obtained. This undrawn yarn was drawn at a draw ratio of 2.5 at 80° C. with the hot roll drawing machine, and thereby a drawn yarn having a fiber diameter of 18 μm was obtained. The weight residual ratio of this yarn was 15% and the dry-heat shrinkage percentage was 3% at 80° C., presenting low shrinkability. This fiber was cut into 6 mm to obtain a fiber assembly having a moisture percentage of 28%. The kneadability of this shrinkable fiber with respect to the fired body base was good, and the moldability with respect to the tea bowl was also good. When the molded tea bowl was fired by means of the abovementioned method, cracks occurred and many carbides were observed on the fiber, which damaged the surface appearance. The bulk specific gravity of the fired body was 1.9, which was still heavy.

Comparative Example 3

A commercially available polyvinyl alcohol fiber (vinylon) having a melting point of 240° C., a fiber diameter of 17 μm and a fiber length of 6 mm was obtained. The weight residual ratio thereof was 25%, the dry-heat shrinkage percentage was 2% at 80° C., and the moisture percentage of the fiber assembly was 0%, meaning that the fiber assembly was in a substantially dry state. The standard moisture regain was 5%. This fiber was about to be added and kneaded with the fired body base, but the processability was poor because the fibers scattered easily. The moldability with respect to the tea bowl was not on a satisfactory level. When the molded tea bowl was fired by means of the abovementioned method, acetic acid odor was generated. Cracks occurred on the obtained fired body and many carbides of fibers were observed, which damaged the surface appearance. The bulk specific gravity of the fired body was 2.0, which was still heavy.

Comparative Example 4

A polypropylene having a melting point of 160° C. and MFR of 24 g/10 min was subjected to melt-spinning. A satisfactory level of spinnability was obtained. Thus obtained undrawn yarn was drawn at a draw ratio of 4.0 at 80° C. with the hot roll drawing machine, and thereby a drawn yarn having a fiber diameter of 25 μm was obtained. The weight residual ratio of this yarn was 2% and the dry-heat shrinkage percentage was 4% at 80° C., presenting low shrinkability. This shrinkable fiber was cut into 1 mm to obtain a fiber assembly having a moisture percentage of 26%. Because the fiber length was as short as 1 mm, the kneadability of this shrinkable fiber with respect to the fired body base was good, and the moldability with respect to the tea bowl was also good. When the molded tea bowl was fired by means of the abovementioned method, cracks occurred, which made the appearance unacceptable. The bulk specific gravity of the fired body was 2.0, which was heavy.

Comparative Example 5

A high-density polyethylene having a melting point of 130° C. and MFR of 26 g/10 min was arranged in the first component, the polypropylene having a melting point of 160° C. and MFR of 16 g/10 min was arranged in the second component, and these were conjugated in a conjugation pattern of sheath/core=first component/second component=50/50 and subjected to melt-spinning. A satisfactory level of spinnability was obtained. This undrawn yarn was drawn at a draw ratio of 4.3 at 90° C. with the hot water drawing machine, and thereby a drawn yarn having a fiber diameter of 16 μm was obtained. The weight residual ratio of this yarn was 3% and the dry-heat shrinkage percentage was 5% at 80° C., presenting low shrinkability. This shrinkable fiber was cut into 5 mm to obtain a fiber assembly having a moisture percentage of 26%. The kneadability of this shrinkable fiber with respect to the fired body base was good, and the moldability was also acceptable. When the molded tea bowl was fired by means of the abovementioned method, cracks occurred, which made the appearance unacceptable. The bulk specific gravity of the fired body was 1.9, which was slightly heavy

TABLE 1

| | Component 1 | Component 2 | Conjugation Pattern | Spinnability | Drawing Temperature (° C.) | Draw Ratio | Fiber Diameter μm | Fiber Length mm | Moisture Percentage % | Dry-heat Shrinkage Percentage % | Kneadability* and Formability | Appearance of Fired Body | Bulk Specific Gravity |
|---|---|---|---|---|---|---|---|---|---|---|---|---|---|
| Ex. 1 | co-PP | — | — | ⊗ | 30 | 2.4 | 21 | 5 | 26 | 12 | ○ | ⊗ | 1.4 |
| Ex. 2 | LDPE | | | Δ | 50 | 2.0 | 34 | 15 | 0 | 37 | Δ | Δ | 1.0 |
| Ex. 3 | LDPE | PP | Sheath Core | ⊗ | 50 | 1.8 | 25 | 5 | 30 | 12 | ○ | ○ | 1.2 |
| Ex. 4 | LDPE | PP | Sheath Core | ⊗ | 60 | 2.2 | 23 | 5 | 30 | 9 | ○ | ○ | 1.6 |
| Ex. 5 | LDPE EVA | PP | Sheath Core | ○ | 50 | 1.8 | 25 | 5 | 25 | 16 | ○ | ○ | 1.0 |
| Ex. 6 | LDPE | co-PP | Sheath Core | ○ | 40 | 1.6 | 38 | 3 | 20 | 28 | ⊗ | ⊗ | 1.0 |
| Ex. 7 | LDPE | PP | Side-by-side | ⊗ | 60 | 1.5 | 29 | 3 | 20 | 33 | ⊗ | ⊗ | 0.9 |
| Comp Ex. 1 | — | — | — | — | — | — | — | — | — | — | ⊗ | X | 2.1 |

TABLE 1-continued

| | Component 1 | Component 2 | Conjugation Pattern | Spinnability | Drawing Temperature (° C.) | Draw Ratio | Fiber Diameter μm | Fiber Length mm | Moisture Percentage % | Dry-heat Shrinkage Percentage % | Kneadability* and Formability | Appearance of Fired Body | Bulk Specific Gravity |
|---|---|---|---|---|---|---|---|---|---|---|---|---|---|
| Comp Ex. 2 | PET | — | — | ⊗ | 80 | 2.5 | 18 | 6 | 28 | 3 | ○ | X | 1.9 |
| Comp Ex. 3 | PVOH | — | — | — | — | — | 17 | 6 | 0 | 2 | Δ | X | 2.0 |
| Comp Ex. 4 | PP | — | — | ⊗ | 80 | 4.0 | 25 | 1 | 26 | 4 | ⊗ | X | 2.0 |
| Comp Ex. 5 | HDPE | PP | Sheath Core | ⊗ | 90 | 4.3 | 16 | 5 | 26 | 5 | ○ | X | 1.9 |

PP: Polypropylene
co-PP: Propylene copolymer
PET: Polyethylene terephthalate
PVOH: Polyvinyl alcohol
HDPE: High-density polyethylene
LDPE: Lowdensity polyethylene
EVA: Ethylene-vinyl acetate copolymer
*How the fibers are dispersed in the molded body base, the number of entangled fibers, uniformity and the like.

The invention claimed is:

1. A method for preparing a porous molded body comprising steps of:
    adding a shrinkable fiber to a base material for forming a porous molded body and kneading a mixture of the base material and the shrinkable fiber such that the shrinkable fiber is evenly dispersed in the base material;
    drying or biscuit-firing the resulting mixture of the base material and the shrinkable fiber so that pores are formed in the dried or biscuit-fired base material;
    final firing the dried or biscuit-fired mixture of the base material and the shrinkable fiber at a temperature of at least 700° C.; and
    wherein the shrinkable fiber comprises a thermoplastic resin and has a fiber diameter of 10 to 40 μm, a fiber length of 1 to 20 mm, and a dry-heat shrinkage percentage of at least 8% when subjected to a heat treatment at 80° C. for 5 minutes,
    the shrinkable fiber is a conjugate fiber that comprises a first component comprising a thermoplastic resin and a second component comprising a thermoplastic resin having a higher melting point than a melting point of the first component, and
    the base material is at least one material selected from the group consisting of clay, colored clay, alumina, and cement.

2. The method for preparing the porous molded body according to claim 1, wherein the conjugate fiber has a weight residual ratio of 10% or lower when heated at 500° C.

3. The method for preparing the porous molded body according to claim 2,
    wherein the first component of the conjugate fiber is a mixture of two or more types of thermoplastic resins different from each other, and
    at least one of the thermoplastic resins has a melting point of 100° C. or lower.

4. The method for preparing the porous molded body according to claim 1,
    wherein an assembly of the shrinkable fibers has 5 to 50% of a moisture percentage after approximately 100 g of the assembly of the shrinkable fibers are cut into any length and collected and dried at 80° C. for three hours, wherein the moisture percentage is calculated using a following equation:

moisture percentage of fiber assembly (%)=(mass of non-dried fiber assembly−mass of dried fiber assembly)/mass of dried fiber assembly×100.

5. The method for preparing the porous molded body according to claim 1, wherein the step of said drying or biscuit-firing comprises biscuit-firing the resulting mixture, and said base material is at least one material selected from the group consisting of the clay, the colored clay, and the alumina.

6. The method for preparing the porous molded body according to claim 1, wherein said base material is the cement.

7. The method for preparing the porous molded body according to claim 1,
    wherein the thermoplastic resin is selected from a group consisting of ethylene copolymers, elastomer resins, low-density polyethylene, linear low-density polyethylene, high-density polyethylene, polypropylene, and propylene copolymers.

* * * * *